July 28, 1925.
C. STEENSTRUP
1,547,839
TOOL
Filed March 30, 1923
Fig. 1.
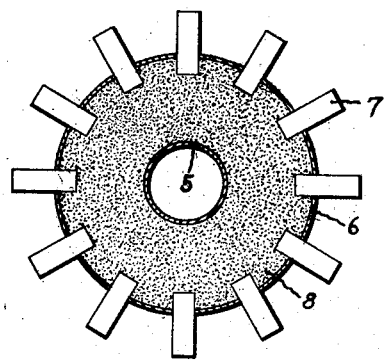
Fig. 3.
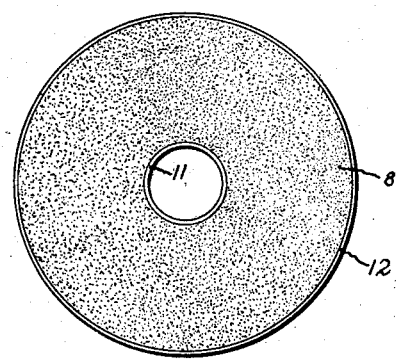
Fig. 2.
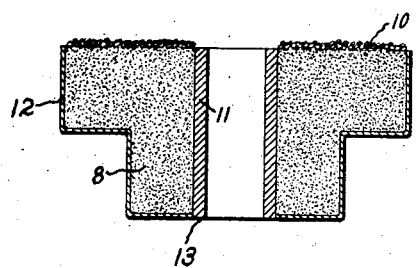
Fig. 4.
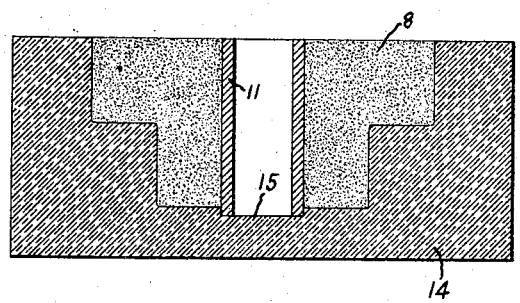
Fig. 6.
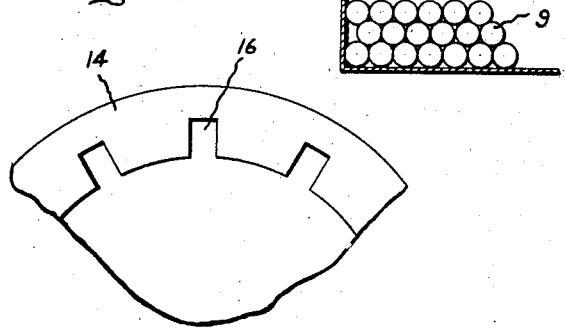
Fig. 5.
Fig. 7.
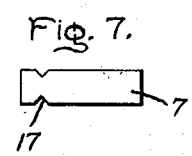
Inventor:
Christian Steenstrup,
by *Alexander T. Lewis*
His Attorney.

Patented July 28, 1925.

1,547,839

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

TOOL.

Application filed March 30, 1923. Serial No. 628,929.

*To all whom it may concern:*

Be it known that I, CHRISTIAN STEENSTRUP, a citizen of the United States, residing at Schenectady, county of Schenectady, State of New York, have invented certain new and useful Improvements in Tools, of which the following is a specification.

In the manufacture of metal-cutting tools such as milling cutters, dies, etc., it is the usual practice to form them of very high grade tool steel which is expensive. In the forming of them a relatively large amount of material is cut away in the form of chips which is only of value as scrap.

I have invented or discovered a means whereby only the cutting parts of the tools need be made of high grade tool steel or equivalent cutting material, the carrier or supporting member being made of a composite material invented by me.

For a consideration of what I believe to be novel and my invention, attention is directed to the accompanying description and claims appended thereto.

Fig. 1 is a view in section of a milling cutter; Fig. 2 is a sectional view of a simple die; Fig. 3 is a plan view of the same; Fig. 4 is a sectional view of a modified form of container which may be employed in the manufacture; Fig. 5 is a detail view on a greatly exaggerated scale of some of the steel shot used in the composite backing material; Fig. 6 shows a modified form of container for making milling cutters especially for quantity production, and Fig. 7 is a view of a tool showing anchoring means.

In carrying out my invention according to the plan shown in Fig. 1, I make a container out of relatively thin sheet steel. It may be drawn up out of a single piece of stock or made of two or more pieces suitably united. As shown it comprises a pair of concentric steel rings 5 and 6 which are connected at the bottom to form a relatively shallow receptacle. The inside ring defines the opening for the driving shaft. The outside ring is radially slotted, and in each of the slots is located a small piece of high grade tool steel 7 or equivalent cutting material which forms one of the teeth, blades or tools of the milling cutter and of which as many may be provided as are desirable. As shown each tool extends radially from the axis of the container. The tools or blades are supported by the walls of the slots in which they are located. Ordinary friction fits are sufficient since the only requirement is that the teeth be properly spaced and maintain their relation one to another.

After the parts are thus assembled they are united into a unitary structure by an improved composite metal 8 invented by me and which forms the subject matter of a separate application for patent filed of even date herewith Serial No. 628,926. In the best and simplest embodiment for the present invention, this metal comprises a base composed of mild steel shot or balls 9 of such diameter that the voids between them are of a capillary nature. Steel shot are self-packing, that is to say, when poured into the container they will distribute or pack in the same manner that small lead shot will pack when poured into a container. This means that the shot will freely run to all parts of the container and fill all of the spaces between the walls thereof and the article which is to be anchored therein. The voids in the mass of shot are filled with boronized copper or copper which has first been treated in a hydrogen furnace to remove impurities.

Having assembled the cutting parts in the container, steel shot are poured into the container filling the same to the level of the top of the container. On top of the shot are then distributed small pieces of copper after the manner of those indicated at 10 in Fig. 2 and in sufficient amount to fill the capillary voids. Any excess of copper will overflow the walls of the container or small drains may be provided at the bottom of the container or both, to dispose of it. The container and its contents are then placed in a closed furnace in which a supply of hydrogen or other selected gas is constantly maintained. The temperature of the furnace is raised to a point sufficiently high to melt the copper which flows by capillary action into and fills the voids and also fuses the shot to each other, to the walls of the container and to the teeth or cutters 7. By placing the copper on top of the shot, as distinguished from mixing it with them, all gases formed in the molten copper are liberated at a point above the shot and in this manner all danger of disturbing the shot is avoided and the resulting product is free from pockets and is dense and homogeneous throughout. By suitable test I have determined that this composite metal has approximately the same strength as mild steel and that it can be treated in the same way. That is to say, it may be rolled hot or cold, swaged, forged, machined or ground by the usual and ordinary means.

After the furnace operation is completed the cutter may be finished and the teeth tempered by the usual machine shop methods employed in such cases. It will be noted that the composite material forms the backing or support for the cutting teeth, which metal is relatively cheap as compared to that of the tool or high speed steel used in the teeth. Also that the formation of the structure is such that spaces are left between the teeth or cutters and hence the machining operations are greatly simplified.

In Fig. 2 is shown a simple die for forming small disks, the cooperating punch being omitted from the figure. In the center is a tubular member 11 which forms the tool and which is made of high grade steel or equivalent cutting material. Surrounding it is a thin walled metal container 12 in which the tool is suitably located and supported. The container may be made in one piece by drawing operations or it may be made of two or more pieces suitably united. After the container is formed the tool 11 is inserted and sufficient steel shot 9 poured into the container to fill it to the desired level. On top of the shot is then distributed sufficient copper 10 to fill the capillary voids, after which the container and its contents are placed in a closed furnace and treated as previously described.

On being removed the structure may be machined and tempered by ordinary machine shop methods which includes turning the inner surface of the tool. In so doing the container 12 may be entirely removed or not as desired. 13 indicates the cutting surface of the die and when this becomes dull it may be sharpened by grinding the lower face thereof and also of the container or of the composite metal as the case may be.

Fig. 4 illustrates a container 14 which is made of heat-resisting material such as hard pressed asbestos board or of a suitable composition. As shown the tubular member or tool 11 extends into a small socket 15 which supports it in an upright position. Additional means for supporting the member 11 may be employed if desired.

After the parts are suitably assembled, the container is filled with steel shot and the necessary amount of copper distributed over the top after which the container and its contents are put in a closed furnace and treated as before. In this construction the supporting or backing portion composed of composite metal will be finished all over and the projecting end of the member 11 will be cut off flush with the bottom of the holder.

It will be evident that instead of making the container 6 of Fig. 1 wholly out of metal, it can be made of two concentric rings which are placed on a base made of the material 14 as described in connection with Fig. 4.

For quantity production of milling cutters, I may use containers of the character shown in Fig. 6. That is to say, they are made of the same material as the container of Fig. 4 and are provided with slots 16 in which the tools are placed preparatory to filling the container with shot.

When using cutting tools made of materials other than steel, it is sometimes desirable to roughen the inner ends of the tools to form an anchor, as for example by roughening or cutting notches in the inner ends thereof as indicated at 17 in Fig. 7.

What I claim as new and desire to secure by Letters Patent of the United States, is,—

1. In a device of the character described, the combination of a tool with a composite metal carrier or backing therefor comprising a base of self-packing metal pieces and a void-filling material which unites the tool and said base into an integral structure.

2. In a device of the character described, the combination of a cutting member with a composite metal carrier or backing therefor comprising a base of steel shot having voids of a capillary nature and copper in sufficient amount to fill the voids, said copper uniting the shot with each other and with the cutting member.

3. In a device of the character described, the combination of a cutting member, a metallic container in which the member is positioned, and a support for the member which fills the container, surrounds the member, and comprises a base of steel shot having voids which are of a capillary nature and copper filling the voids and uniting the shot with each other, with the cutting member and also with the walls of the container.

4. In a device of the character described, the combination of a metal container comprising a tubular element, an outer element arranged concentrically with the first, metallic members which are positioned by the outer element, the inner ends of which are located between the two elements, and a composite metal filling the space between the elements comprising a base of steel shot having voids of a capillary nature and copper filling the voids and uniting the shot with each other, with the elements and with the members.

5. In a device of the character described, the combination of a pressed metal container comprising a tubular element which defines a shaft opening, an outer element which is concentric with the first and is provided with slots, outwardly-extending members which are located in the slots and positioned by the walls thereof, the inner ends of the members being situated between the elements, a composite supporting material filling the space between the elements and comprising a base of small steel shot, and copper in sufficient amount to fill the voids between the shot, said copper uniting the shot with each other, with the elements and with the inner ends of the members.

In witness whereof, I have hereunto set my hand this 29th day of March, 1923.

CHRISTIAN STEENSTRUP.